United States Patent [19]

Kanayama et al.

[11] Patent Number: 5,677,859
[45] Date of Patent: Oct. 14, 1997

[54] CENTRAL PROCESSING UNIT AND AN ARITHMETIC OPERATION PROCESSING UNIT

[75] Inventors: Kenjiro Kanayama, Yokohama; Seiji Hinata, Kawasaki; Toshiyuki Shinoda, Tokyo; Tadashi Yabuta, Kawasaki, all of Japan

[73] Assignee: Kabushiki Kaisha Toshiba, Kawasaki, Japan

[21] Appl. No.: 382,794

[22] Filed: Feb. 2, 1995

[30] Foreign Application Priority Data

Feb. 2, 1994 [JP] Japan ................... 6-010847

[51] Int. Cl.[6] ............................................. G06F 9/302
[52] U.S. Cl. ............................................. 364/736; 395/562
[58] Field of Search ................................ 364/736; 395/375, 395/562

[56] References Cited

U.S. PATENT DOCUMENTS

| | | | |
|---|---|---|---|
| 5,038,312 | 8/1991 | Kojima | 364/736 |
| 5,311,458 | 5/1994 | Haines | 364/736 |
| 5,430,852 | 7/1995 | Watanabe et al. | 395/375 |
| 5,473,557 | 12/1995 | Harrison et al. | 364/736 |
| 5,473,764 | 12/1995 | Chi | 395/375 |

*Primary Examiner*—David H. Malzahn
*Attorney, Agent, or Firm*—Oblon, Spivak, McClelland, Maier & Neustadt, P.C.

[57] ABSTRACT

An arithmetic operation processing unit provided with an external program memory storing a high speed instruction group for executing a specific routine of arithmetic operations which require high speed execution is shown. The arithmetic operation processing unit comprises a start address register for holding a starting address of the specific routine of arithmetic operations and an end address register for holding an end address of the specific routine of arithmetic operations, an FIFO type RAM for storing microcodes obtained by decoding the high speed instruction group. The high speed instruction group stored in the program memory is sequentially read out by a first instruction execution control means from the start address to the end address and decoded into corresponding microcodes when a high speed instruction group decoding instruction is executed. The microcodes thus obtained are then stored in the FIFO type RAM. The microcodes thus stored in the FIFO type RAM are executed one for each clock when a high speed instruction group execution instruction is executed.

5 Claims, 3 Drawing Sheets

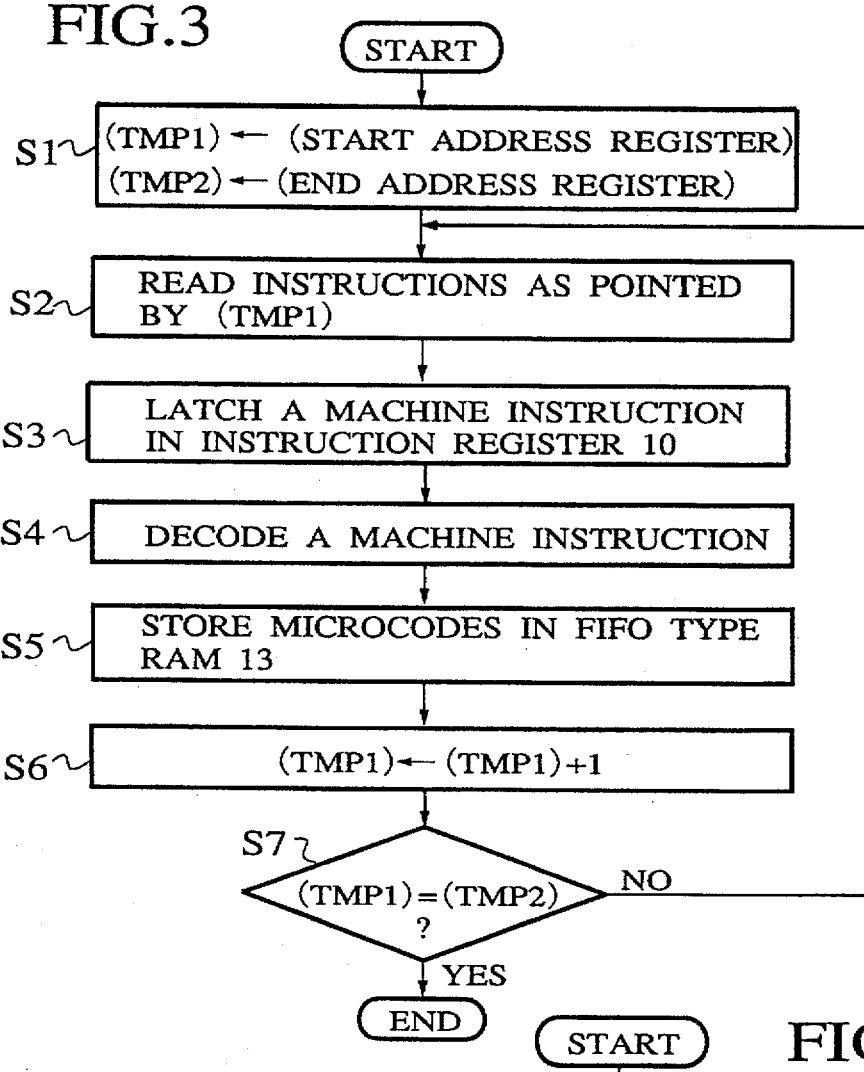
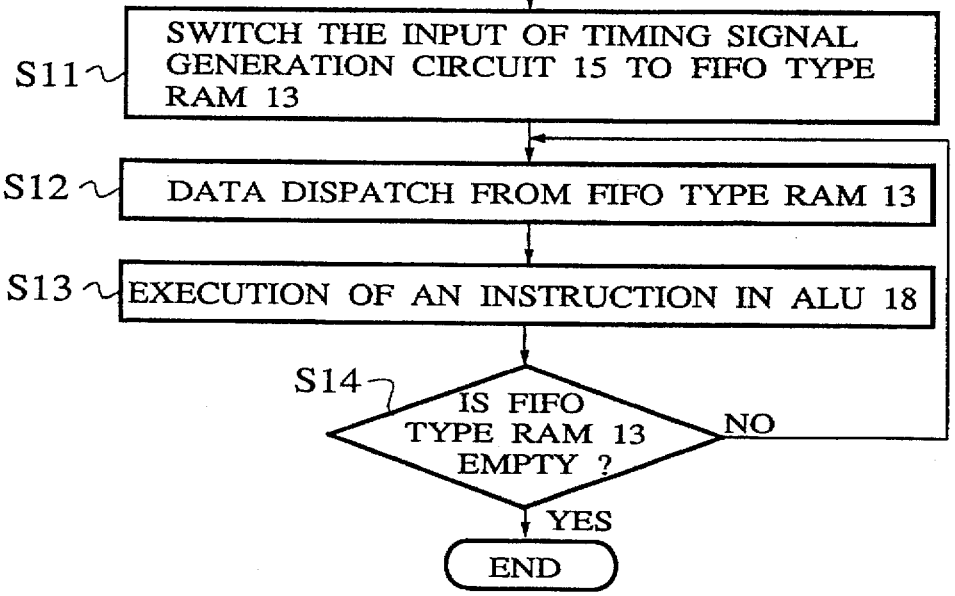

CENTRAL PROCESSING UNIT AND AN ARITHMETIC OPERATION PROCESSING UNIT

BACKGROUND OF THE INVENTION

1. Field of the Invention

The present invention relates to a central processing unit and an arithmetic operation processing unit for executing software including a specific routine of arithmetic operations which requires high speed execution such as multiplication-addition complex operations as required in the field of the digital servo control. Particularly, the present invention relates to a central processing unit and an arithmetic operation processing unit in the form of a microcomputer.

2. Description of the Prior Art

Recently, there increasingly arises a great demand for high speed operation of a central processing unit (CPU), which is a core element of computer systems. Particularly, some software include a specific routine of arithmetic operations which require high speed execution such as multiplication-addition arithmetic operations (e.g., A×B+C).

Such specific routines are executed at high speeds in some conventional computer system by the use of particular hardware exclusively provided for this purpose, such as an external digital signal processor (DSP).

FIG. 1 is a block diagram showing a prior art computer system provided with an external digital signal processor.

This computer system is composed of a CPU 101, an external program memory (main memory) and an external DSP. They are connected to each other by an address bus, a data bus and several control lines for communication among them. The control lines includes a read request line RD through which a read request signal can be transmitted from the CPU 101 to the external DSP and the external program memory 103. The control lines also includes a write request line WR through which a write request signal can be transmitted from the CPU 101 to the external program memory 103 for initiating write cycles.

When data is transmitted from the CPU 101 to the external DSP 102, the write request line WR is activated while outputting an I/O address to the external DSP 102. The external DSP 102 can receive the data outputted from the CPU 101 in an internal register designated by the address. Also, when data is transmitted from the external DSP 102 to the CPU 101, the read request line RD is activated while outputting an I/O address to the external DSP 102. The CPU 101 can receive the data outputted from a register designated by the address of the external DSP 102.

In the computer system designed in this fashion, the following processes have been employed for executing a specific routine of arithmetic operations which require high speed execution, e.g., complex arithmetic operations such as combination of multiplication and addition. Namely, the CPU 101 decodes instruction codes indicative of such a routine fetched from the external memory and sends necessary data to the DSP 102 through registers provided in the CPU 101 only for the DSP 102, which can finish the routine several times faster than the CPU 101.

Contrary to this, in the computer system designed for which no particular hardware such as a DSP is provided, the following processes have been employed for executing arithmetic operations which require high speed execution. 1) A particular CPU is utilized which is provided with specific instructions respectively provided for executing a complex arithmetic operation composed of a plurality of arithmetic operations (e.g., a multiplication-addition instruction) only by a single instruction. 2) The routine is handled as a subroutine.

However, when a DSP is used, there are several shortcomings as follows. Namely, in recent years, many microcomputers have been designed to be packed within a single chip together with all the necessary circuits associated therewith. However, when a DSP is incorporated in a single chip microcomputer, the amount of hardware becomes extremely large so that the necessary area of the chip is substantially increased resulting in a very high production cost. Furthermore, in the case of high speed arithmetic operation by the use of DSPs, there are available only predetermined routines such as multiplication instructions, multiplication-addition instructions, which have been implemented within the DSP.

Also, when complex arithmetic operations are implemented in the architecture of a CPU as machine instructions, the execution speed can not be increased so high since several arithmetic operations are simply combined. Furthermore, such complex arithmetic operations are fixed but not arbitrarily designed in the application level.

On the other hand, when specific arithmetic operation routines are handled as subroutines in software, an end programmer can arbitrarily design necessary routines. However, the constituent instructions contained in a respective subroutine must be decoded in sequence repeatedly each time when called. Furthermore, data transfer to/from a stack area, a program counter, internal registers and so forth requires substantial time associated with the procedure of calling each subroutine and returning therefrom.

SUMMARY OF THE INVENTION

The present invention has been made in order to solve the shortcomings as described above. It is an object of the present invention to provide a central processing unit and an arithmetic operation processing unit capable of executing at a high speed a specific routine of arithmetic operations which require high speed execution without increasing the amount of hardware (at low cost).

It is another object of the present invention to provide a central processing unit and an arithmetic operation processing unit allowing an end programmer to arbitrarily design the specific routine of arithmetic operations to be executed at a high speed.

To achieve the foregoing and other object, and in accordance with the present invention, as embodied and broadly described herein, an arithmetic operation processing unit comprises a program memory in which is stored a high speed instruction group for executing a specific routine of arithmetic operations which require high speed execution, a start address register for holding a starting address of the specific routine of arithmetic operations, an end address register for holding an end address of the specific routine of arithmetic operations, an FIFO type RAM for storing microcodes obtained by decoding the high speed instruction group, first instruction execution control means for sequentially reading out the high speed instruction group stored in the program memory from the start address to the end address, sequentially decoding the high speed instruction group into corresponding microcodes and storing the microcodes in the FIFO type RAM when a high speed instruction group decoding instruction is executed, second instruction execution control means for sequentially executing the microcodes stored in the FIFO type RAM one for each clock when a high speed instruction group execution instruction is executed.

Namely, in accordance with the present invention, a specific routine of arithmetic operations desired to be executed at a high speed and stored in an external program memory by an end user is transferred to an FIFO type RAM through a microcode ROM in the form of microcodes corresponding to machine instructions of the specific routine. The microcode ROM also includes a specific microcode for initiating execution of the microcodes corresponding to the machine instructions of the specific routine. When the specific microcode is executed, microcodes to be executed is supplied from the FIFO type RAM in place of the microcode ROM.

In other words, in accordance with the structure as described above, the start address and the end address of the specific routine desired to be executed at a high speed is loaded respectively in a start address register and an end address register in advance. The high speed instruction group corresponding to the specific routine stored in the program memory is read out from the start address to the end address and sequentially decoded into corresponding microcodes, followed by storing the microcodes in the FIFO type RAM, when a high speed instruction group decoding instruction is executed. The microcodes stored in the FIFO type RAM is sequentially executed one for each clock when a high speed instruction group execution instruction is executed.

By this structure, it becomes possible to execute at a high speed the specific routine of arithmetic operations which require high speed execution without increasing the amount of hardware and to allow an end programmer to arbitrarily design the specific routine of arithmetic operations to be executed at a high speed.

The accompanying drawings, which are incorporated in and form a part of the invention and, together with the description, serve to explain the principles of the invention.

BRIEF DESCRIPTION OF DRAWINGS

FIG. 3 is a flowchart illustrating the process of execution of the high speed instruction group decoding instruction.

FIG. 4 is a flowchart illustrating the process of execution of the high speed instruction group execution instruction.

DETAILED DESCRIPTION OF EMBODIMENTS

Figure 1:
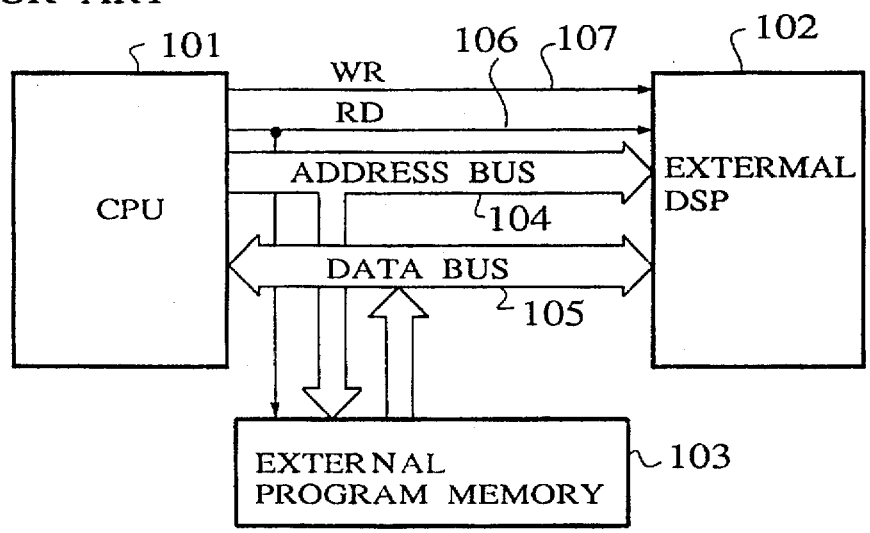
FIG. 1 is a block diagram showing a prior art computer system provided with an external digital signal processor.
Figure 2:
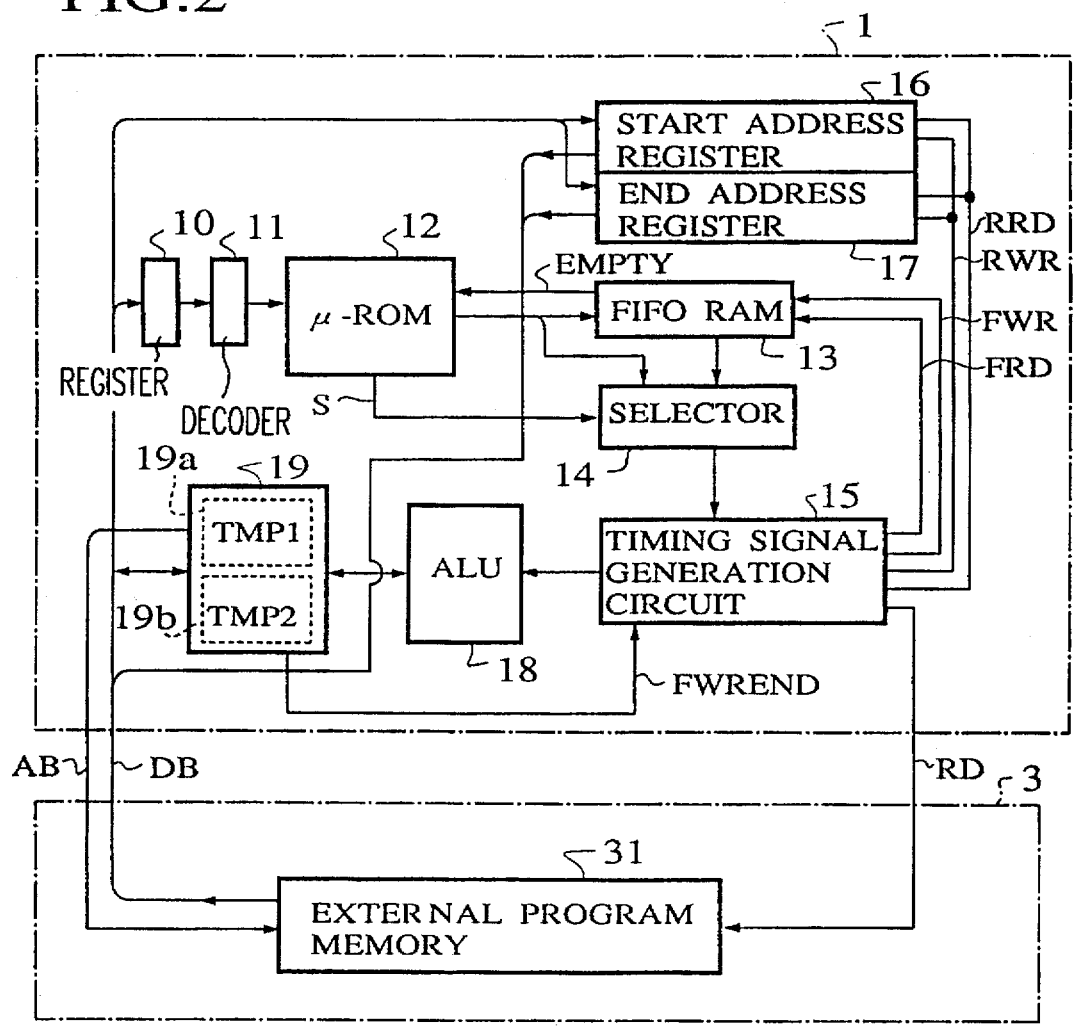
FIG. 2 is a block diagram showing an arithmetic operation processing unit for executing arithmetic operations in accordance with the present invention.

Referring now to the accompanying drawings, an arithmetic operation processing unit provided with a central processing unit (CPU) for executing arithmetic operations in accordance with the present invention will be described. FIG. 2 is a block diagram showing a computer system including the CPU.

The computer system comprises a CPU 1 for executing machine instructions including a variety of arithmetic operations and an external memory unit 3 including an external program memory 31 for exchanging data with the CPU 1 through an address bus AB (24 bits) and a data bus DB (18 bits).

The machine instructions stored in the external program memory 31 includes a normal instruction group which are executed in a normal procedure in the same manner as in a prior art technique, a high speed instruction group forming a specific routine of arithmetic operations which require high speed execution, a high speed instruction group decoding instruction for decoding execution of the high speed instruction group and a high speed instruction group execution instruction for initiating execution of the high speed instruction group as described in supra.

A machine instruction fetched from the external program memory 31 is first latched in an instruction register 10 from which is output an address of a starting microcode to a microcode ROM 12. The microcode ROM 12 stores necessary microcodes for executing all the machine instructions output from the external program memory 31. A decoder 11 may be interposed between the instruction register 10 and the microcode ROM 12 for decoding the opcode of a machine instruction into the address of a starting microcode to the microcode ROM 12.

The microcodes stored in the microcode ROM 12 includes microcodes for executing the high speed instruction group, microcodes for executing the high speed instruction group decoding instruction and microcodes for executing the high speed instruction group execution instruction in addition to the usual microcodes for executing the normal instruction group which are common to a prior art CPU.

The microcodes output from the microcode ROM 12 is supplied to an FIFO (First-In First-Out) type RAM 13 and a selector 14. The selector 14 serves to transfer either of microcodes output from the microcode ROM 12 and the FIFO type RAM 13 in accordance with the selection signal S which is activated to execute a specific routine of arithmetic operations which require high speed execution on the basis of microcodes output from the FIFO type RAM 13.

The microcodes output from the selector 14 is supplied to a timing signal generation circuit 15. The timing signal generation circuit 15 sequentially outputs necessary timing signals to the respective circuit elements of the CPU 1 for executing respective microcodes. The timing signals includes a read request signal RD supplied to the external program memory 31 which output necessary data on the data bus DB corresponding to the current address on the address bus AB in response to the read request signal RD, a read request signal RRD supplied to a start address register 16 and an end address register 17 which output data contained therein to an internal register file 19 respectively in response to the read request signal RRD, a write request signal RWR supplied to the start address register 16 and the end address register 17 which receive current data on the address bus AB in response to the write request signal RWR, control signals supplied to an arithmetic and logic unit (ALU) 18 which actually performs arithmetic operations in response to the control signals, a read request signal FRD supplied to the FIFO type RAM 13 which outputs data contained therein respectively in response to the read request signal FRD and a write request signal FWR supplied to the FIFO type RAM 13 which receives current data on the address bus AB in response to the write request signal RWR.

In this case, the start address register 16 and the end address register 17 contain respectively the start address and the end address of the extended instruction routine of arithmetic operations which require high speed execution. These addresses are set in the start address register 16 and the end address register 17 in advance of execution of the routine by a program designed in due course.

The ALU 18 is connected to the external program memory 31 through the internal register set 19. The internal register set 19 includes temporary registers 19a and 19b receiving the start address and the end address of the extended instruction routine of arithmetic operations, which require high speed execution, from the start address register 18 and the end address register 17. The internal register set 19 also includes other several registers (not shown in the figure) which have been generally utilized to save necessary information in usual operation of the CPU 1, e.g., a program counter which identifies the next machine instruction to be executed after the currently executed instruction, a status register which indicates the current status of the CPU 1 and so forth. When execution of the high speed instruction group is completed, a high speed execution completion signal FWREND is output to the timing signal generation circuit 15.

Next, the operation of the system as described above will be explained in the following with reference to FIGS. 3 to 5.

FIG. 3 is a flowchart illustrating the process of execution of the high speed instruction group decoding instruction. FIG. 4 is a flowchart illustrating the process of execution of the high speed instruction group execution instruction. FIG. 5 is a timing chart illustrating the process of execution of the high speed instruction group execution instruction.

When the high speed instruction group decoding instruction is fetched from the external program memory 31, the microcode ROM 12 sequentially outputs microcodes in accordance with the high speed instruction group decoding instruction. These microcodes corresponding to the high speed execution routine of arithmetic operations which require high speed execution as illustrated in FIG. 3. In this case, the selection signal S is not activated so that the selector 14 outputs microcodes from the microcode ROM 12 to the generation circuit 15 to execute microcodes in the microcode ROM 12 rather than microcodes contained in the FIFO type RAM 13. The high speed instruction group decoding instruction is executed as follows.

Namely, the timing signal generation circuit 15 first outputs the read request signal RRD to the start address register 16 and the end address register 17 in response to a microcode in step S1. As a result, the start address and the end address of the high speed instruction group in the external program memory 31 are transferred from the start address register 16 and the end address register 17 to the temporary registers 19a and 19b (labeled TMP1 and TMP2).

Next, the timing signal generation circuit 15 outputs the read request signal RD to the external program memory 31, while the start address contained in the temporary register 19a is transferred to the external program memory 31. As a result, a first machine instruction of the high speed instruction group is fetched in step S2. The first machine instruction is latched in the instruction register 10 to supply the first address of the corresponding microcodes through the decoder 11 in Step 3. The microcode ROM 12 sequentially outputs the microcodes to the selector 14 in Step S4. Namely, the first machine instruction is decoded in the form of microcodes.

Next, the timing signal generation circuit 15 outputs the write request signal FWR to the FIFO type RAM 13 in response to the microcode. The microcode output from the microcode ROM 12 is stored in FIFO type RAM 13 in accordance with the write request signal FWR in Step S5.

The address contained in the temporary register 19a is then incremented in Step S6 followed by comparing the same with the end address contained in the temporary register 19b in Step S7. If these contents are not equal to each other (it is always the case at the first comparison), the sequence of the routine is returned to Step 2. This process is repeated until the address contained in the temporary register 19a is equal to the end address contained in the temporary register 19b.

The high speed instruction group stored in the external program memory 31 from the start address to the end address is then converted to the corresponding microcodes and stored in the FIFO type RAM 13 in sequence. When the address contained in the temporary register 19a is equal to the end address contained in the temporary register 19b, the internal register set 19 outputs the high speed execution completion signal FWREND to the timing signal generation circuit 15 and deactivate the write request signal FWR followed by returning execution of machine instructions of the normal instruction group.

Figure 5:
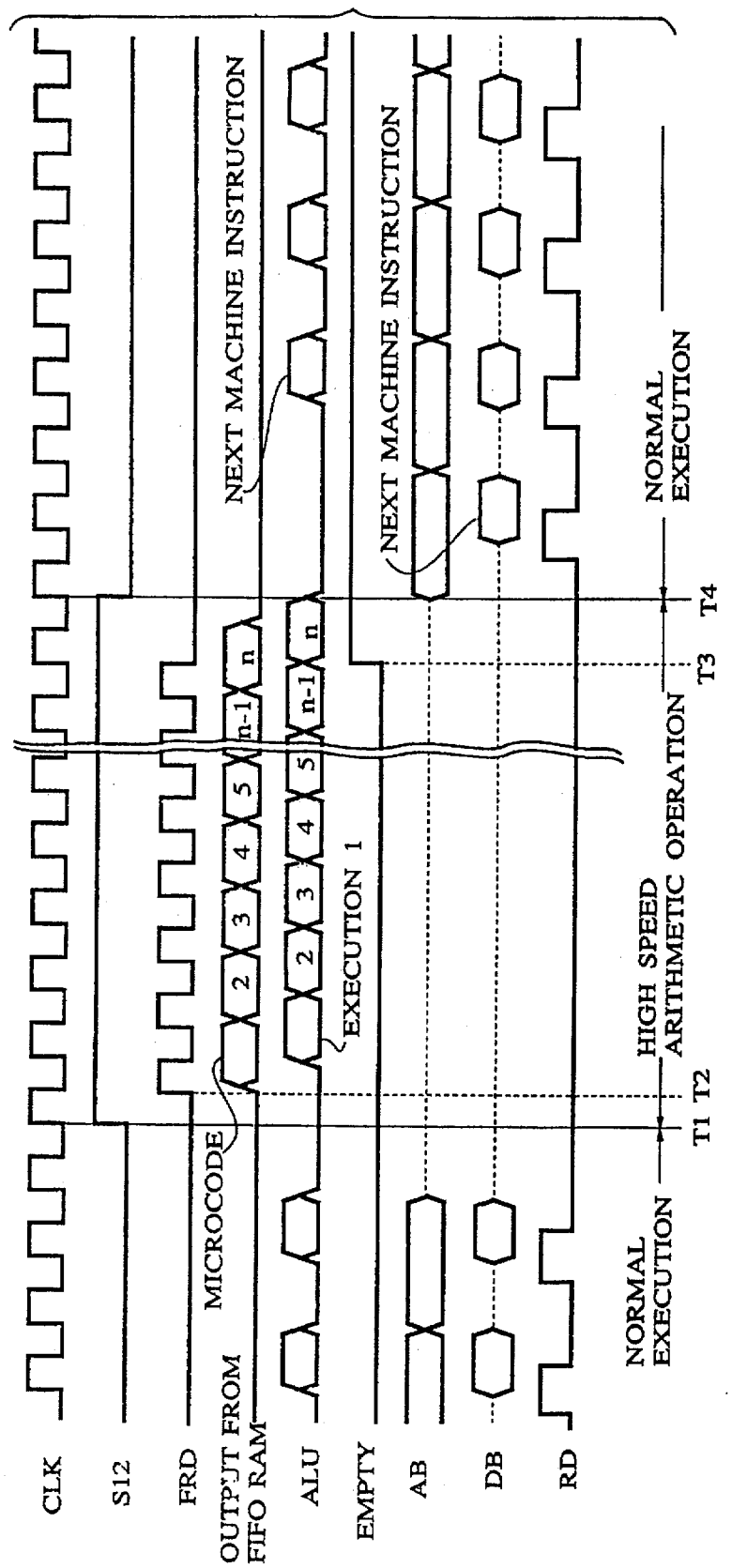
FIG. 5 is a timing chart illustrating the process of execution of the high speed instruction group execution instruction.

The high speed instruction group is executed as illustrated in FIGS. 4 and 5. Namely, when the high speed instruction group execution instruction is fetched and decoded at T1 in the flowchart of FIG. 5, the execution of the high speed instruction group is sequentially carried out as illustrated in FIG. 4.

First, the microcode ROM 12 activates the selection signal S to be "1" to switch the output of the selector 14 from the microcodes contained in the microcode ROM 12 to the microcodes contained in the FIFO type RAM 13 in Step S11.

The timing signal generation circuit is then outputs the read request signal FRD of "1" for each clock after ½ clock elapses (T2). The FIFO type RAM 13 sequentially outputs respective microcodes in response to the read request signal FRD corresponding to the high speed instruction group. The timing signal generation circuit 15 receives the microcodes and generates necessary timing signals to execute the high speed instruction group in the ALU 18 in Step S13. After execution of each microcode, it is confirmed whether or not there is a subsequent microcode to be executed in the FIFO type RAM 13 in Step S14. Steps S12 to S14 are repeated until execution of all the microcodes in the FIFO type RAM 13 is completed.

When all the microcodes in the FIFO type RAM 13 is executed (the condition of Step S14 are affirmative), the FIFO type RAM 13 outputs an signal EMPTY of "1" to the microcode ROM 12 to indicate the completion of the execution of the high speed instruction group at T3. The microcode ROM 12 resets the selection signal S to be "0" so that the selector 14 selects the microcodes output from the microcode ROM 12 rather than the FIFO type RAM 13 in order to resume execution of normal instructions at T4. The signal EMPTY is then reset to be "0" in order that the status of the CPU 1 is resumed as that prior to the execution of the high speed instruction group execution instruction. The high speed instruction group can be repeatedly executed only by executing the high speed instruction group execution instruction at any time after the high speed instruction group decoding instruction has been executed for a single time.

There are substantial advantages in accordance with the present invention as compared with a conventional technique as follows.

In the case of executing a specific routine of arithmetic operations as a subroutine without using a DSP, a number of machine instructions must be fetched and executed in sequence each time when the subroutine is called. Namely, i) each machine instruction corresponding to microcodes for executing the subroutine must be fetched from a main memory; ii) each machine instruction fetched must be decoded into microcodes through a microcode ROM; and iii) a subroutine call instruction and a return instruction must be executed each time when the subroutine is called.

Contrary to this, in accordance with the present invention, the above procedures i) and ii) are necessary only when the high speed instruction group decoding instruction is executed but thereafter their procedures need not be taken to make it possible to immediately execute the high speed arithmetic operation. Furthermore, the above procedures iii) is completely dispensed with in accordance with the present invention.

It becomes therefore possible to execute a specific routine of arithmetic operations which require high speed execution without increasing the amount of hardware (i.e., at low cost). Furthermore, the high speed instruction group can be arbitrarily designed by an end programmer.

As described above, in accordance with the present invention, a specific routine of arithmetic operations (high speed instruction group) which require high speed execution is executed as follows. Namely, in advance of actually executing the specific routine, machine instructions of the specific routine are sequentially read out from an external program memory, decoded and stored in an FIFO type RAM in the form of corresponding microcodes through a microcode ROM by executing the high speed instruction group decoding instruction. When execution of the high speed instruction group becomes necessary, the high speed instruction group execution instruction is executed to initiate execution of the high speed instruction group by the use of microcode stored in the FIFO type RAM without accessing the external program memory and the microcode ROM. The microcodes stored in the microcode ROM can therefore be immediately executed one for each clock so that it is possible to execute a specific routine of arithmetic operations which require high speed execution without increasing the amount of hardware at low cost and that the high speed instruction group can be arbitrarily designed by an end programmer.

In the embodiment of the present invention as described above, the completion of execution of the high speed instruction group is indicated by the EMPTY signal output from the FIFO type RAM 13. However, a specific microcode can be provided in the microcode ROM 12 for the same purpose. The specific microcode is located at the end of the high speed arithmetic operation routine and serve to return the control to the microcode ROM 12 by changing the input of the selector 14 to the microcode ROM 12.

Also, alternatively, a plurality of high speed instruction groups can be available and switched from one to another within a single program. For example, in the case utilizing first and second high speed instruction groups, the two high speed instruction groups are stored as part of a single program in an external program memory together with four pointers to their respective start and end addresses. The two high speed instruction groups can be utilized as follows.

The pointers to the start and end addresses of the first high speed instruction group are transferred to the start address register 16 and the end address register 17 followed by execution of the high speed instruction group decoding instruction in advance of executing the first high speed instruction group. The FIFO type RAM 13 is then filled with the microcodes of the first high speed instruction group. Thereafter, the first high speed instruction group can be executed by executing the high speed instruction group execution instruction without accessing the external program memory 31 and the microcode ROM 12 as explained above.

Next, in the location of the program where the second high speed instruction group is frequently used, the pointers to the start and end addresses of the second high speed instruction group are transferred to the start address register 16 and the end address register 17 followed by execution of the high speed instruction group decoding instruction in advance of executing the second high speed instruction group. The FIFO type RAM 13 is then filled with the microcodes of the second high speed instruction group. Thereafter, the second high speed instruction group rather than the first high speed instruction group is executed by executing the high speed instruction group execution instruction without accessing the external program memory 31 and the microcode ROM 12.

The foregoing description of preferred embodiments has been presented for purposes of illustration and description. It is not intended to be exhaustive or to limit the invention to the precise form described, and obviously many modifications and variations are possible in light of the above teaching. The embodiment was chosen in order to explain most clearly the principles of the invention and its practical application thereby to enable others in the art to utilize most effectively the invention in various embodiments and with various modifications as are suited to the particular use contemplated.

What is claimed is:

1. A central processing unit comprising:

temporary registers for holding a starting address and an end address of a specific routine of arithmetic operations stored in an external program memory;

a microcode ROM for storing microcodes necessary to execute machine instructions including a high speed instruction group decoding instruction and a high speed instruction group execution instruction;

an FIFO type RAM connected to said microcode ROM for sequentially storing microcodes output from said microcode ROM when said high speed instruction group decoding instruction is executed;

a selector connected to said microcode ROM and said FIFO type RAM for outputting microcodes from said FIFO type RAM in place of microcodes from said microcode ROM when said high speed instruction group execution instruction is executed; and means coupled to said temporary registers and said selector for executing microcodes output from said selector.

2. An arithmetic operation processing unit comprising:

a program memory in which is stored a high speed instruction group of machine instructions for executing a specific routine of arithmetic operations which require high speed execution;

a start address register for holding a starting address of said specific routine of arithmetic operations;

an end address register for holding an end address of said specific routine of arithmetic operations;

an FIFO type RAM for storing microcodes obtained by decoding said high speed instruction group;

first instruction execution control means coupled to said start address register and said end address register, for sequentially reading out said high speed instruction group stored in said program memory from said start address to said end address, sequentially decoding said high speed instruction group into corresponding microcodes and storing the microcodes in said FIFO type RAM when a high speed instruction group decoding instruction is executed;

second instruction execution control means coupled to said FIFO type RAM for sequentially executing the microcodes stored in said FIFO type RAM one for each clock when a high speed instruction group execution instruction is executed.

3. The arithmetic operation processing unit as claim in claim 2, wherein said first instruction execution control means comprises:

holding transfer control means for temporarily transferring, to first and second temporary registers, said starting address and said end address stored in said start address register and said end address register, respectively;

first reading control means for controlling reading of machine instructions stored in said program memory from said starting address to said end address stored in said first and second temporary registers after said transfer control means temporarily transfers said starting address and said end address to said first and second temporary registers;

instruction decoding control means for controlling decoding machine instructions read out by means of said first reading control means;

storing control means for controlling storing the microcodes obtained by said instruction decoding control means in said FIFO type RAM;

increment control means for incrementing the address stored in sid first temporary register when said high speed instruction group execution instruction is executed; and comparison means for judging whether or not the address stored in said first temporary register reaches to said end address stored in said second temporary register, said increment control means incrementing the address stored in said first temporary register only when said first temporary register is less than said end address stored in said second temporary register.

4. The arithmetic operation processing unit as claimed in claim 2, wherein said second instruction execution control means comprising:

second reading control means for controlling reading of the microcodes stored in said FIFO type RAM one for each clock when said high speed instruction group execution instruction is executed;

execution control means for controlling execution of the microcodes read out in said FIFO type RAM by means of said second reading control means;

second comparison means for Judging whether or not there remains a further microcode to be executed in said FIFO type RAM, said second reading control means and said for execution control means operating only when there remains at least one microcode to be executed in said FIFO type RAM.

5. A central processing unit comprising:

storing means for storing instructions;

executing means for executing instructions;

supplying means connected to said storing means, an external memory and said executing means for supplying instructions in sequence to said executing means selectively from either of said storing means and said external memory;

transfer means for transferring a sequence of instructions to said storing means from said external memory; and microcode ROM through which said supplying means supplies instructions from said external memory to said executing means in the form of microcodes, wherein said transfer means transfers the sequence of instructions to said storing means in the form of microcodes through said microcode ROM.

\* \* \* \* \*